N. GOLDBERG.
WIND SHIELD.
APPLICATION FILED JAN. 17, 1916.
1,226,203.
Patented May 15, 1917.
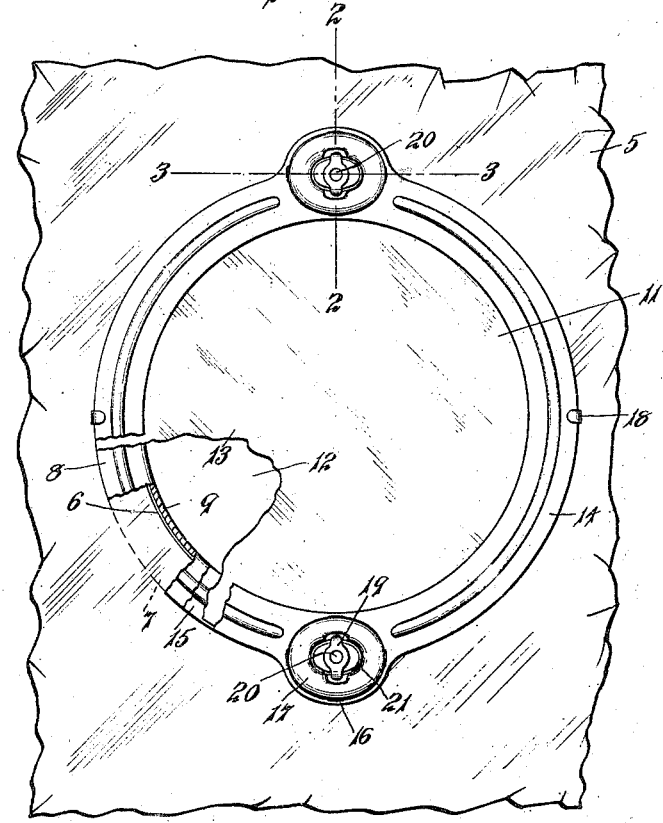
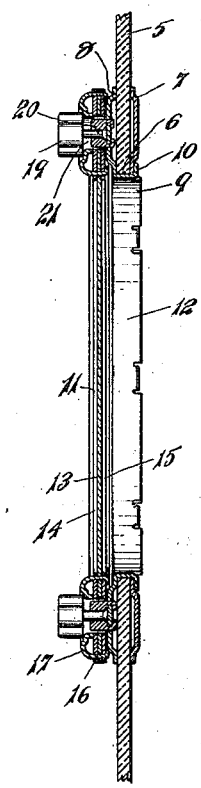
WITNESSES:
INVENTOR.
Hannan Goldberg
BY
Arthur B Jenkins
ATTORNEY.

UNITED STATES PATENT OFFICE.

NAIMAN GOLDBERG, OF HARTFORD, CONNECTICUT.

WIND-SHIELD.

1,226,203.

Specification of Letters Patent.

Patented May 15, 1917.

Application filed January 17, 1916. Serial No. 72,477.

*To all whom it may concern:*

Be it known that I, NAIMAN GOLDBERG, a citizen of the United States, residing at Hartford, in the county of Hartford and State of Connecticut, have invented a new and Improved Wind-Shield, of which the following is a specification.

My invention relates to the class of devices employed to shield the occupants of vehicles from the wind, my invention relating especially to covers for sight openings through wind shields of any ordinary construction, and an object of my invention, among others, is to provide an efficient and durable frame for such an opening and cover therefor.

One form of wind shield embodying my invention and in the construction and use of which the objects herein set out, as well as others, may be attained is illustrated in the accompanying drawings, in which,—

Figure 1 is a face view of a portion of a wind shield embodying my invention with parts broken away to show the construction.

Fig. 2 is a view in central section on plane denoted by dotted line 2—2 of Fig. 1.

Fig. 3 is a view in section through the cover (looking down) on plane denoted by dotted line 3—3 of Fig. 1.

In the accompanying drawings the numeral 5 indicates a portion of the wind shield of a vehicle, as an automobile, or which may be a window in a trolley car, locomotive or other vehicle. This shield has an opening 6, preferably round, to which a frame composed of rings 7—8 is applied. The hole in the ring 7 is approximately the same size as the opening 6, and the ring 8 is provided with a flange 9 turned from its inner edge to pass through the opening 6, this flange being preferably of a size to fit quite close within said opening. This flange may be continuous as shown herein, or it may be otherwise constructed to pass through the opening 6 and through the hole in the ring 7. The edge, or a portion thereof, of this flange is overturned against the outer face of the ring 7 to secure the two rings firmly together and against opposite sides of the shield 5. In the construction shown herein fingers 10 located at suitable intervals apart about the flange are bent over against the face of the ring 7 to clamp the two rings together.

A cover 11 is formed to close the sight opening 12 through the frame of the wind shield. This cover comprises a piece 13 of transparent material as glass, celluloid or the like, and a border composed of rings 14—15 the openings in which are of a size substantially that of the sight opening 12. The rings and piece 13 are of a size somewhat larger than said sight opening so that they will thoroughly cover it. The rings 14—15 are applied to opposite sides of the piece 13 and they are secured together as by prongs 16 passing through the rings from an eyelet 17, the prongs being clenched to secure the parts firmly together. These eyelets 17 are preferably two in number, they are located at diametrically opposite sides of the rings comprising the border, and as additional means of fastening these rings together a finger or fingers 18 projecting from the outer edge of one ring may be bent over the outer edge of the opposite ring. These fingers may be located in any suitable positions between the eyelets.

Buttons 19 are rotatably secured to the ring 8 as by means of studs 20 projecting from said rings. These buttons are oblong in shape and of a size to pass through the holes 21, in one position of the buttons, but they extend across opposite edges of said holes when turned to another position in a manner common to devices of this class, and as shown in Fig. 1 of the drawings. The invention forming the subject matter of this application is of the same character as that embodied in my copending application filed January 10, 1916, S. No. 71,165, the present invention residing in a different construction of the rings comprising the frame of the opening and the border of the cover from that illustrated and described in my copending case.

While I have shown and described herein a preferred arrangement of parts embodying my idea these may be changed to a greater or lesser degree and yet be within the spirit and intent of the invention.

I claim—

A wind shield having a sight opening therein and a frame comprising rings located on opposite sides of the shield about said opening, one of said rings having an extension from the edge of the opening therein passing through said sight opening within the edge thereof, fingers spaced apart about the edge of said extension and projecting therefrom, said fingers being overturned against the face of the other ring, and a button rotatably secured to one of said rings.

NAIMAN GOLDBERG.